No. 708,876. Patented Sept. 9, 1902.
A. H. EDWARDS.
MECHANISM FOR RELEASING OR OPERATING PHOTOGRAPHIC SHUTTERS.
(Application filed Apr. 18, 1902.)
(No Model.) 4 Sheets—Sheet I.
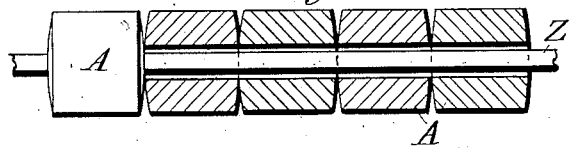
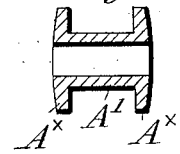
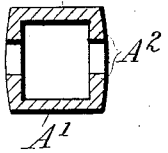
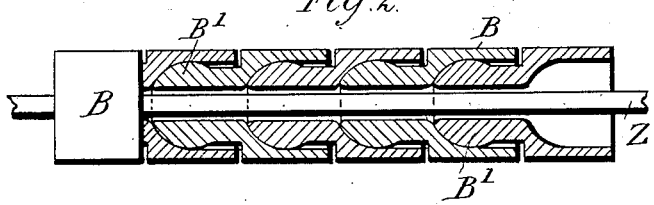
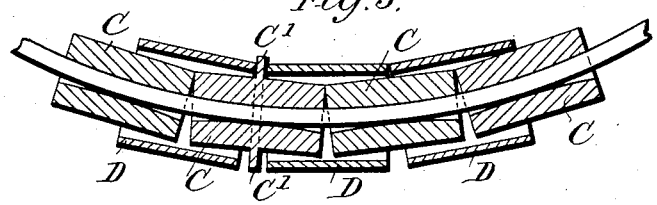
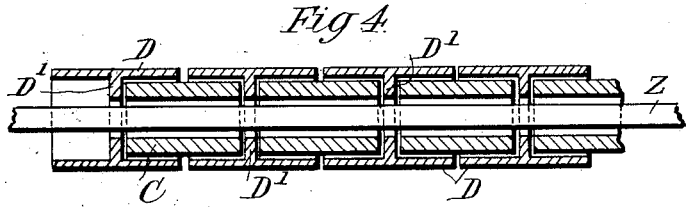
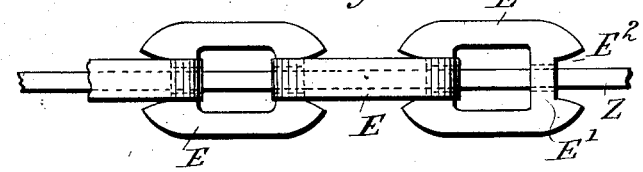
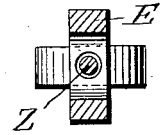
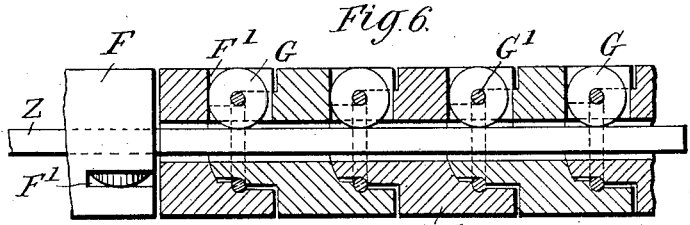
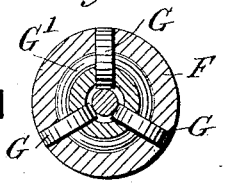
Witnesses. Inventor:
A. H. Edwards
by Wilkinson & Fisher
Attorneys.

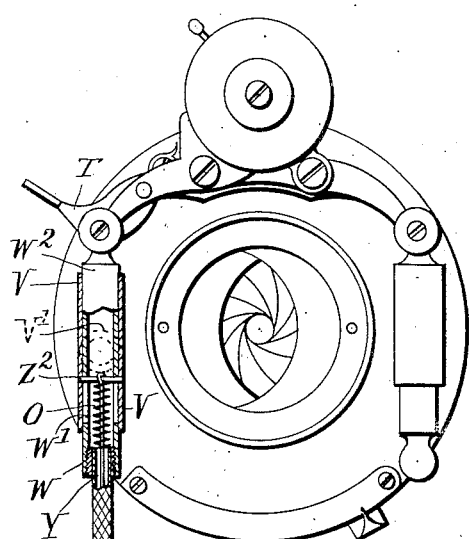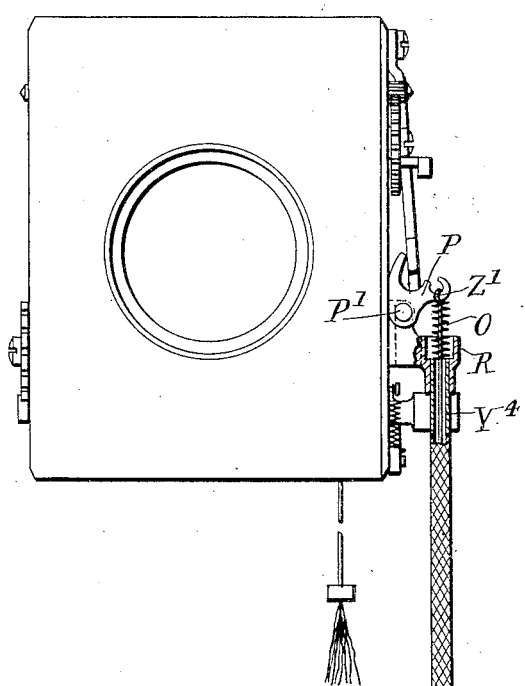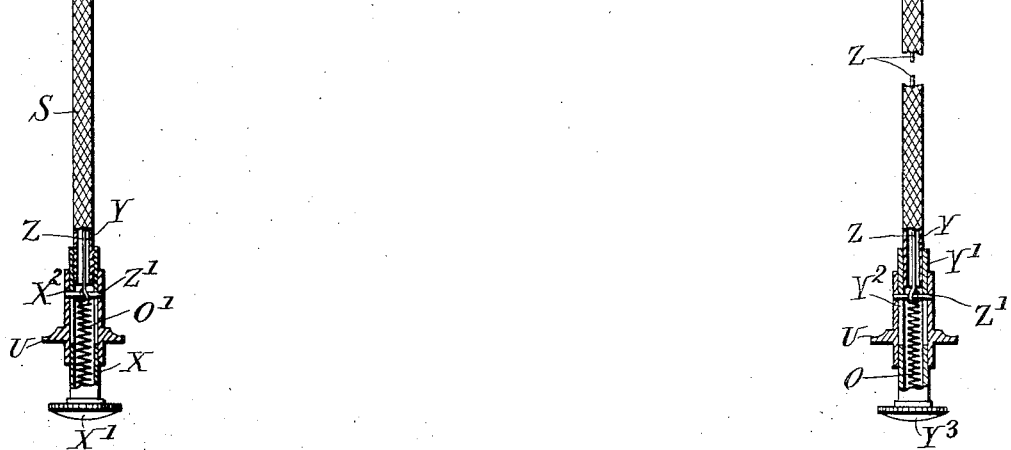

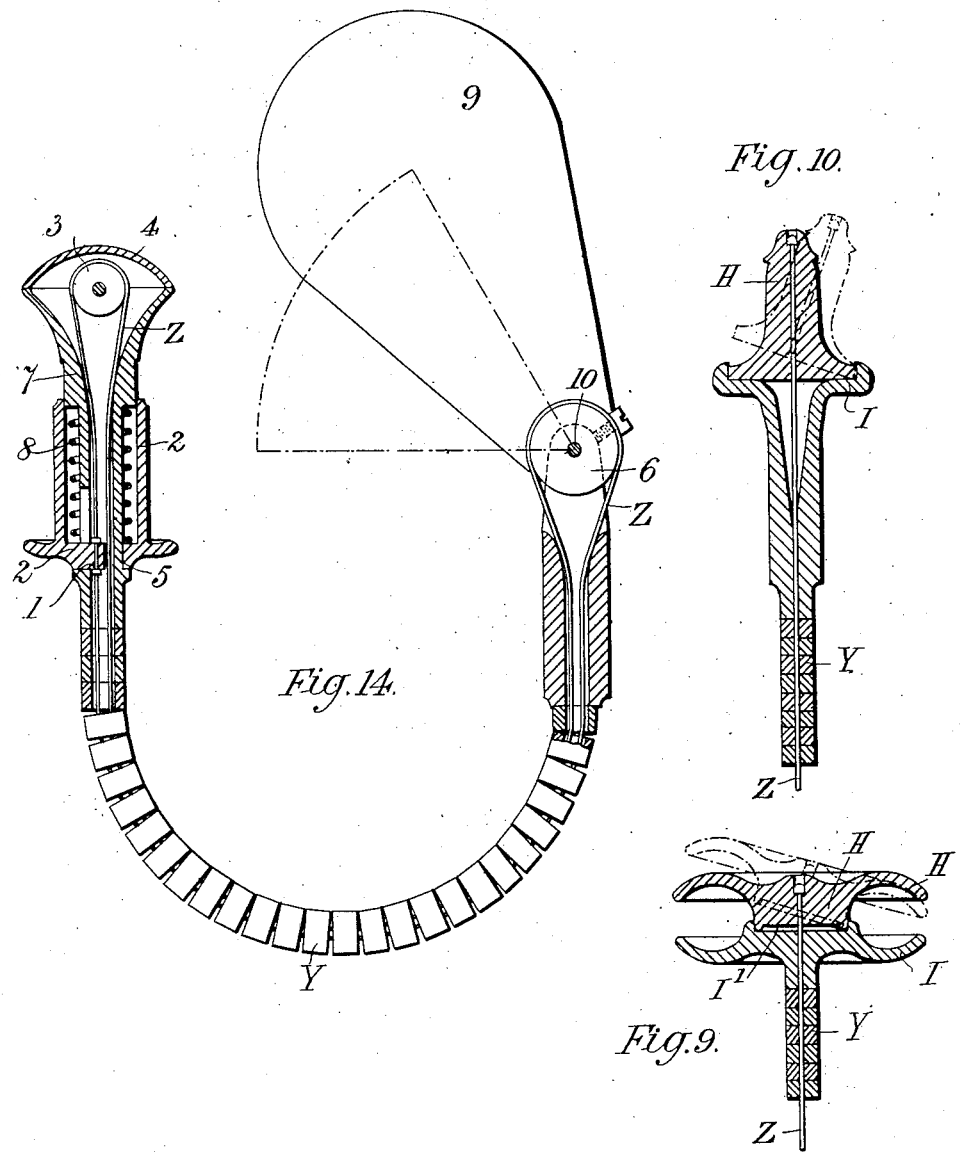

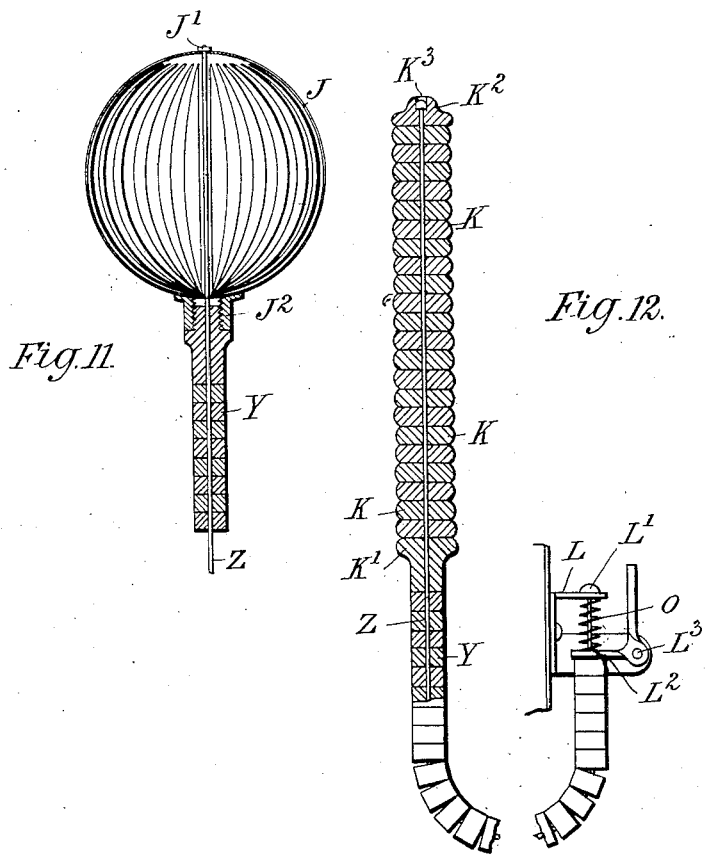

United States Patent Office.

ARTHUR HENRY EDWARDS, OF LONDON, ENGLAND.

MECHANISM FOR RELEASING OR OPERATING PHOTOGRAPHIC SHUTTERS.

SPECIFICATION forming part of Letters Patent No. 708,876, dated September 9, 1902.

Application filed April 18, 1902. Serial No. 103,633. (No model.)

*To all whom it may concern:*

Be it known that I, ARTHUR HENRY EDWARDS, engineer, a subject of the King of Great Britain, residing at 96 Lordship road, Stoke Newington, London, England, have invented certain new and useful Improvements in Mechanism for Releasing or Operating Photographic Shutters, of which the following is a specification.

This invention relates to mechanism for releasing or operating photographic shutters.

Heretofore pneumatic means or apparatus have been employed to release pneumatic shutters, whereas according to my present invention I transmit the necessary power to release the shutter or to operate the shutter (either to give the exposure or to set the shutter ready for giving an exposure and thereafter release said shutter to give the exposure) by mechanical means adapted to produce either traction or pressure, or both—*i. e.*, reciprocatory motion. I employ two flexible members so combined and arranged that same are capable of movement longitudinally with respect to one another, or one such member only may be capable of endwise movement with respect to the other, and for my present purpose I advantageously employ the particular construction of power-transmitting mechanism forming the subject-matter of my application for Letters Patent of the United States filed January 2, 1902, Serial No. 88,186, which mechanism I have illustrated in Figures 1 to $6^a$ of the drawings hereunto annexed.

Referring to the accompanying drawings, Fig. 1 is a longitudinal view, partly in section, of one form of the flexible tubing. Figs. $1^a$ and $1^b$ are longitudinal sections of modified forms of sleeves. Fig. 2 is a similar view to Fig. 1, showing a modified construction. Fig. 3 is a longitudinal sectional view of another modification. Fig. 4 is a similar view to Fig. 3, showing a further modification. Fig. 5 is a longitudinal view showing the outer member formed of open links. Fig. $5^a$ is an end view thereof. Fig. 6 is a longitudinal view, partly in section, showing the outer member provided with antifriction-rollers. Fig. $6^a$ is an end view thereof. Fig. 7 shows an application of the flexible tubing to a camera-shutter, the outer flexible member being shown as the movable member. Fig. 8 shows another application of the flexible tubing to a camera, the inner flexible member being shown as the movable member; and Figs. 9 to 14 show alternative means for imparting motion to the flexible tubing.

In Fig. 1, A A are short rigid sleeves, (advantageously formed of metal,) and Z is the inner flexible connection, which can freely pass through the opening in said sleeves A. In Fig. $1^a$ the sleeves are formed with a thinner wall A' and a collar $A^\times$. In Fig. $1^b$ the sleeve A' is formed with an inwardly-extending collar $A^2$. In Fig. 2 each sleeve is formed with a hollow part B and rounded extension B' thereon, adapted to fit within the hollow part B of the adjacent section. In Fig. 3 a double series of short tubes are shown—viz., inner sleeves C, with flanges C', and outer sleeves D. In Fig. 4 the outer sleeves D are formed with an internal flange D', the inner tubes C being without flanges thereon. In Figs. 5 and $5^a$ a series of links E are employed, with cross-bar E' and recess $E^2$ at each end thereof. In Figs. 6 and $6^a$ the sleeves F F are slotted at F'' and provided with a series of antifriction-rollers G, revolubly mounted on a ring G' and located in the said sleeves in such wise that the peripheries of said rollers G serve as antifriction-rollers, against which the inner flexible connection Z may bear, all as fully set forth in my said prior application for United States patent filed January 2, 1902. Therefore no claim is made herein to the foregoing power-transmitting mechanism separately, as same forms the subject of my said earlier application for United States patent as aforesaid. In order to release or operate pneumatic shutters by means of these two said flexible members according to the present invention, I proceed in any of the following manners: I attach one end of one of the members (say the flexible outer casing) to the frame or a fixed part of the casing of a photographic shutter and the corresponding end of the other member (say the inner flexible connection) to a part of the shutter mechanism—as, for instance, to a releasing pawl or catch, which normally holds the shutter when "set" ready for giving an exposure. The other end of the outer casing is provided with any suitable knob or handle or lever, (which I will refer to as "No. 1 handle,") and the corresponding end of the inner connection is attached to another knob, handle, or lever, (which I will refer to as "No. 2 handle,") adapted to be moved upon or with respect to the No. 1 handle. For instance, according to the present invention the No. 1 handle may be carried on a slotted rod and the No. 2 handle carried on a sleeve adapted to slide on said slotted rod, the lower end of which latter is tubular or provided with a bore through which the flexible inner connection is led, and the end of the latter connected by means of a cross-bar working in the aforesaid slotted rod and fixed to the aforesaid sleeve on said rod. Thus by simply pressing together the No. 1 and No. 2 handles power or motion is transmitted to the releasing-pawl or other part to be operated. A spring may be provided to return said parts to their normal position, or I may employ other alternative means or mechanism to impart motion to either or both of the two said flexible members, all as hereinafter fully described with reference to the drawings hereunto annexed.

Referring to Fig. 7 of the drawings, the outer casing, (formed of said short rigid tubes, sleeves, or links, &c.,) which I will here designate Y and constructed in any of the aforesaid manners, is attached at one end to or bears against the short tubular socket X, which is provided with an enlarged head X', and is slotted at $X^2$, while the other end of said outer casing Y is fixed to or bears against the tube W which latter is vertically slotted at W', and at its upper end $W^2$ is connected to the releasing lever or "trigger" T by means of which latter the shutter is released; this tube W being adapted to slide within the tubular socket V which may be swiveled at V' to the main frame of the shutter; the inner flexible connection Z being attached at one end to the cross-bar Z' adapted to slide in the aforesaid slots $X^2$ in the said tubular socket X, which cross-bar Z' is fixed to the sliding collar U, which is adapted to slide freely on the said tubular socket X; while the other end of said inner flexible connection Z is connected to the fixed cross-bar $Z^2$; with a spring O interposed between said cross-bar $Z^2$ and the end of the outer casing Y; the said cross-bar $Z^2$ being located in the slots W' in the part W: Thus by pressing said button X' toward the collar U the outer casing Y is compressed and consequently by means thereof the part or tube W is forced upwardly (through the socket V) and thereby the trigger T operated and the shutter released; while, on the operator releasing the collar U and the button X', the spring O will return the part W and casing Y to the normal position, ready for the shutter to be reset, a supplementary spring O' being provided, if desired, in the socket X between the end X' and the cross-bar Z'. When the said tubes, sleeves, beads, links, &c., Y have been threaded on the inner flexible connection Z, same may advantageously be inclosed or coated or covered exteriorly in any suitable manner and with any suitable material, either ornamental or otherwise. For instance, as shown in Fig. 7, the said outer member Y may be provided with a covering of braid S, or other textile material may be employed, which may either be first formed into a tube and then slid over said member Y, or same may be braided thereon.

In Fig. 8 I have illustrated my invention as carried into practice in connection with the well-known "roller-blind" type of photographic shutter. The outer casing forming the outer flexible member Y in this case is attached at one end to a slotted tube or sleeve Y', slotted at $Y^2$, which is provided with an enlarged head $Y^3$, the other end of this outer member Y being attached (fixed) at $Y^4$ to a fixed bracket or support R, rigidly attached to the shutter-casing. The inner flexible member Z is attached at its outer end to a cross-bar Z', carried by and fixed in the sliding collar U, which is adapted to slide freely on the said slotted tube or sleeve Y', the cross-bar Z' sliding in the aforesaid slots $Y^2$, the other end of said inner flexible member Z being attached at Z' to the bell-crank or rocker P, pivoted at P' to the casing of the shutter, and a spring O is interposed between said rocker P and the end $Y^4$ of the outer member, and, if desired, a supplemental spring O' may be inserted inside the sleeve Y', between the end $Y^3$ thereof and the cross-bar Z', to thus retain the parts in their normal position. It will thus be seen that by forcing the sliding collar U toward the button or head $Y^3$ thereby the inner flexible connection Z will move the rocker P and release the shutter.

In Figs. 9 to 14 I have illustrated various alternative forms or construction of handles or means according to my present invention to operate the power-transmitting mechanism.

In Fig. 9 the inner flexible connection Z is attached to a circular head, disk, or button H, the inner circular part H' of which rests in a circular socket I', adapted to receive same in the handle or part I, formed as a counterpart of the disk H, so that by pressing the parts H and I together anywhere round their edges the opposite edges will be displaced, as shown in dotted lines in Fig. 9, and thereby the inner flexible connection Z will be put in tension—i. e., will be pulled through the outer casing Y and returned (on releasing the parts H and I) by the operation of a spring—such, for instance, as hereinbefore described with reference to Figs. 7 and 8.

The arrangement shown in Fig. 10 acts in a corresponding manner to that shown in Fig. 9, the parts H and I being differently shaped:

In Fig. 11; the inner flexible connection Z is connected at J' to a compressible and expansible spherical (or otherwise suitably shaped) device J; this device J being attached at $J^2$ to or bearing against the end of the outer casing Y so that by compressing the device J across the middle the end J' will be forced away from the part J² and endwise motion imparted to the connection Z.

In Fig. 12 I have illustrated an arrangement in which a number of washers K are mounted on the inner flexible connection between the collar K' on the outer casing Y and the button K² at the outer end of said washers, to which button K² the end of the inner flexible connection is attached at K³. It will thus readily be seen that by grasping the handle formed of washers K and bending same motion will be imparted to one flexible member with respect to the other. In the arrangement illustrated the other end of the inner flexible connection Z is fixed at L' to a fixed point L, and consequently the end of the outer casing Y will operate or rock the bell-crank or rocker L², pivoted at L³, the spring O being interposed, as hereinbefore described, in order to return the parts to their normal position.

Fig. 13 shows the inner flexible connection Z attached at M² to a lazy-tongs M, the outer casing being attached at M² to another part of said lazy-tongs, so that by contracting or expanding said lazy-tongs relative motion can be imparted to the inner flexible connection Z or the outer casing Y, or both, as desired and according to the manner in which the other end of said two flexible members are connected up to the part to be operated.

Fig. 14 shows the inner flexible connection Z arranged in an endless or continuous form—i. e., said inner flexible connection Z is fixed at the point 1 to the loose sleeve 2 and then extends around the idle wheel 3, mounted inside the hollow movable head 4, upon which latter the sleeve 2 is adapted to slide. From this idle wheel 3 the inner flexible connection passes freely through the sleeve 2 at the point 5, and thence through the flexible outer casing Y to the opposite end thereof, where same passes around a pulley 6, and thence returns back to the sleeve 2, to which same is fixed at the point 1. It will thus be seen that by pulling the sleeve 2 upward and upon the shank or part 7 of the head 4 the inner flexible connection Z will be drawn around the idle wheel 3 and around the pulley 6, and thereby impart rotary motion to the latter, the spring 8 returning the parts to their normal position when released, or the outer casing Y may be formed and arranged with a duplicate and separate passage-way therethrough. It will be obvious that the inner flexible member must in all cases be inextensible either with or without being incompressible, and the outer flexible member or casing Y must in all cases be incompressible both lengthwise and crosswise.

Having now described my invention, what I claim as new, and desire to secure by Letters Patent of the United States, is—

1. In a camera, the combination with the shutter-releasing mechanism, of a flexible inner member secured to the camera; a flexible outer member, movable longitudinally of said inner member, engaging said shutter-releasing mechanism, and comprising a plurality of sections separable from and unconnected to each other; and means for operating said outer member.

2. In a camera, the combination with the shutter-releasing mechanism, of a flexible inner member; a flexible outer member provided with slots and rollers mounted therein, one of said members being movable longitudinally of the other and adapted to engage said shutter-releasing mechanism; and means for operating said movable member.

3. In a camera, the combination with the shutter-releasing mechanism, of a flexible inner member and a flexible outer member, one of said members being movable longitudinally of the other and adapted to engage said shutter-releasing mechanism, said outer member comprising a plurality of sections separable from and unconnected to each other, and each section provided with a slot and a roller mounted therein; and means for operating said movable member.

4. In a camera, the combination with the shutter-releasing mechanism, of a flexible inner member and a flexible outer member, one of said members being movable longitudinally of the other and adapted to engage said shutter-releasing mechanism, said outer member comprising a plurality of sections separable from and unconnected to each other, and each section provided with slots and rollers mounted therein; and means for operating said movable member.

5. In a camera, the combination with the shutter, of a flexible inner member; a flexible outer member, movable longitudinally of said inner member, and comprising a plurality of sections separable from and unconnected to each other, a shutter-releasing device connecting said shutter and outer movable member; and a handle composed of two members, one of said handle members connected to said inner flexible members, and the other said handle member being movable relatively to the first handle member and engaging said outer flexible member for operating the same.

In witness whereof I have hereunto set my hand in presence of two witnesses.

ARTHUR HENRY EDWARDS.

Witnesses:
ALFRED NUTTING,
TH. RANDS.